(12) United States Patent
Rinaldi

(10) Patent No.: US 9,725,041 B2
(45) Date of Patent: Aug. 8, 2017

(54) FLEXIBLE STEP ASSEMBLY FOR VEHICLES

(71) Applicant: RANDY RINALDI WELDING LTD., Bellevue (CA)

(72) Inventor: Randy D. Rinaldi, Bellevue (CA)

(73) Assignee: RANDY RINALDI WELDING LTD., Bellevue (CA)

( * ) Notice: Subject to any disclaimer, the term of this patent is extended or adjusted under 35 U.S.C. 154(b) by 3 days.

(21) Appl. No.: 15/149,854

(22) Filed: May 9, 2016

(65) Prior Publication Data

US 2016/0339843 A1    Nov. 24, 2016

Related U.S. Application Data

(60) Provisional application No. 62/163,741, filed on May 19, 2015.

(51) Int. Cl.
*B60R 3/02*    (2006.01)

(52) U.S. Cl.
CPC ..................... *B60R 3/02* (2013.01)

(58) Field of Classification Search
CPC ...................................................... B60R 3/02
USPC ................................................ 280/163, 166
See application file for complete search history.

(56) References Cited

U.S. PATENT DOCUMENTS

| | | | | |
|---|---|---|---|---|
| 2,647,677 A * | 8/1953 | Reed | ............. | B64C 1/24 105/449 |
| 2,678,832 A * | 5/1954 | Wright | ............. | B60R 3/02 182/89 |
| 3,033,309 A * | 5/1962 | Fugere | ............. | B60R 3/02 182/189 |
| 3,572,753 A * | 3/1971 | Claassen | ............. | B60R 3/02 280/166 |
| 3,603,429 A * | 9/1971 | Shepherd | ............. | B60R 3/00 182/46 |
| 3,743,320 A * | 7/1973 | Clark | ............. | B60R 3/02 182/91 |
| 3,751,068 A * | 8/1973 | Green | ............. | B60R 3/02 280/166 |
| 3,762,742 A * | 10/1973 | Bucklen | ............. | B60R 3/02 280/166 |
| 3,887,216 A * | 6/1975 | Perry | ............. | B60R 3/00 182/90 |
| 3,951,431 A * | 4/1976 | Hopkins | ............. | B60R 3/02 182/89 |
| 3,967,695 A * | 7/1976 | Waddell | ............. | B60R 3/00 182/86 |
| 4,020,920 A * | 5/1977 | Abbott | ............. | B60R 3/02 105/445 |

(Continued)

*Primary Examiner* — Jeffrey J Restifo
(74) *Attorney, Agent, or Firm* — Bennett Jones LLP

(57) ABSTRACT

A flexible step assembly for a vehicle configured to provide stability when being mounted by a user. The flexible step assembly includes a top-plate secured on the top of each side member through a backing plate. The top-plate each seat in a recess of an upper member that is connected to the vehicle and the top-plate and the upper member are connected by a resilient connection such that they can separate by an impact load but will be recoupled by the resilient connection. The top-plate is substantially bisected by its connection to the backing plate so that the backing plates are each substantially centered on the top plates.

29 Claims, 4 Drawing Sheets

(56) References Cited

U.S. PATENT DOCUMENTS

| | | | | |
|---|---|---|---|---|
| 4,021,071 | A * | 5/1977 | Norman | E02F 9/0833 182/84 |
| 4,053,172 | A * | 10/1977 | McClure | B60R 3/02 182/89 |
| 4,054,298 | A * | 10/1977 | Urbaitis | B60R 3/00 182/90 |
| 4,161,997 | A * | 7/1979 | Norman | E06C 5/00 182/127 |
| 4,180,143 | A * | 12/1979 | Clugston | B60R 3/02 182/91 |
| 4,333,547 | A | 6/1982 | Johansson | |
| 4,359,138 | A * | 11/1982 | Kummerlin | E06C 7/16 182/107 |
| 4,412,686 | A * | 11/1983 | Fagrell | B60R 3/02 105/447 |
| 4,564,205 | A * | 1/1986 | Shookman | B60R 3/00 182/196 |
| 5,007,654 | A * | 4/1991 | Sauber | B60R 3/02 182/89 |
| 5,024,292 | A | 6/1991 | Gilbreath et al. | |
| 5,064,023 | A | 11/1991 | Loeber | |
| 5,335,752 | A * | 8/1994 | Kozlowski | E06C 5/02 182/127 |
| 5,375,864 | A * | 12/1994 | McDaniel | B60R 3/02 182/89 |
| 5,628,380 | A * | 5/1997 | Matisi | A62B 5/00 182/196 |
| 5,697,626 | A * | 12/1997 | McDaniel | B60R 3/02 182/91 |
| 5,758,891 | A * | 6/1998 | Fox, Jr. | B60R 3/00 182/90 |
| 5,799,962 | A * | 9/1998 | Barnhart | B60R 3/02 108/131 |
| 6,000,496 | A * | 12/1999 | Rinaldi | B60R 3/02 182/127 |
| 7,055,838 | B2 * | 6/2006 | Lambie | B60R 3/007 182/127 |
| 7,686,133 | B2 * | 3/2010 | Caudill | B60R 3/02 182/127 |
| 8,573,673 | B1 * | 11/2013 | Puglisi, Sr. | E06C 5/02 182/127 |
| 2002/0121760 | A1 * | 9/2002 | Puglisi | B60R 3/007 280/163 |
| 2007/0119655 | A1 * | 5/2007 | Caudill | B60R 3/02 182/97 |
| 2009/0008895 | A1 * | 1/2009 | Casbolt | B60R 3/02 280/166 |
| 2010/0116590 | A1 * | 5/2010 | Rund | E06C 5/04 182/127 |
| 2013/0154230 | A1 * | 6/2013 | Ziaylek | B60R 3/02 280/166 |
| 2014/0319794 | A1 * | 10/2014 | Mullas | B60R 3/02 280/166 |
| 2015/0076785 | A1 * | 3/2015 | Kokot | E06C 1/005 280/166 |

* cited by examiner

FLEXIBLE STEP ASSEMBLY FOR VEHICLES

FIELD OF THE INVENTION

The invention relates in general to a flexible step assembly for attachment to and for use on vehicles, particularly of the commercial type, namely vehicles used for industrial purposes such as road making equipment and heavy farm equipment.

BACKGROUND OF THE INVENTION

There has long been a requirement for steps to allow operators or maintenance personnel ready access to, for example, the body of large vehicles.

As such, the assignee of the present invention had invented a flexible step assembly for vehicles. However, as the size of vehicles has increased, there was a need for an improved flexible step assembly to address concerns of step stability.

SUMMARY OF THE INVENTION

In accordance with a broad aspect of the invention, there is provided a flexible step assembly for vehicles comprising in combination: a first flexible, vertically depending side member and a second flexible, vertically depending side member, each of the first and the second side members having an upper portion; at least one horizontally extending tread member attached between the first and the second side members; a first shock absorbing assembly operably connected to the upper portion of the first side member and a second shock absorbing assembly operably connected to the upper portion of the second side member, each of the first and second shock absorbing assemblies including an upper section, a lower section and a resilient connection between the upper section and the lower section, the upper section and the lower section being resiliently interconnected and partially separable under impact by the resilient connection, sufficient to permit the step assembly to move such that damage of the step assembly due to impact is substantially prevented, wherein: the resilient connection serves to recouple the upper section and the lower section when separated by impact; and the lower section of each of the first and the second shock absorbing assembly comprises a top-plate secured to the resilient connection and being configured to bear at an upper facing surface against the upper section and a backing plate for connecting the first and the second shock absorbing assembly to the upper portions of the first and second side members, the backing plate of each of the first and the second shock absorbing assembly including an upper end connected to, and extending along a diameter of a lower facing surface of the top-plate.

In accordance with a broad aspect of the invention, there is provided a flexible step assembly for vehicles comprising in combination: a first flexible, vertically depending side member and a second flexible, vertically depending side member, each of the first and the second side members having an upper portion; at least one horizontally extending tread member attached between the first and the second side members; a first shock absorbing assembly operably connected to the upper portion of the first side member and a second shock absorbing assembly operably connected to the upper portion of the second side member, each of the first and second shock absorbing assemblies including an upper section, a lower section and a resilient connection, the upper section and the lower section being resiliently interconnected and partially separable under impact by the resilient connection, sufficient to permit the step assembly to move in a direction of impact such that damage of the step assembly due to impact is substantially prevented, wherein: the resilient connection serves to recouple the upper section and the lower section when separated by impact and the resilient connection includes: a spring; and a flexible connector extending from a pull cup on the spring centrally through the spring; the lower section of each of the first and the second shock absorbing assemblies comprises: a top-plate secured at a mounting site to the flexible connector and being configured to bear at an upper facing surface against the upper section; and a backing plate for connecting the first and the second shock absorbing assembly to the upper portions of the first and second side members, the backing plate of each first and the second shock absorbing assembly including an upper end connected to and extending along a diameter of a lower facing surface of the top-plate; and the upper section of each of the first and the second shock absorbing assemblies comprises: an elongate hollow tubular member having a lower opening; and a flange extending about the lower opening, the flange including a recess on its bottom surface and wherein the top-plate of the lower section is configured to fit in and interlock with the recess.

BRIEF DESCRIPTION OF THE DRAWINGS

The invention will now be described, by way of example only, reference being made to the accompanying drawings in which.

DESCRIPTION OF VARIOUS EMBODIMENTS

Figure 1:
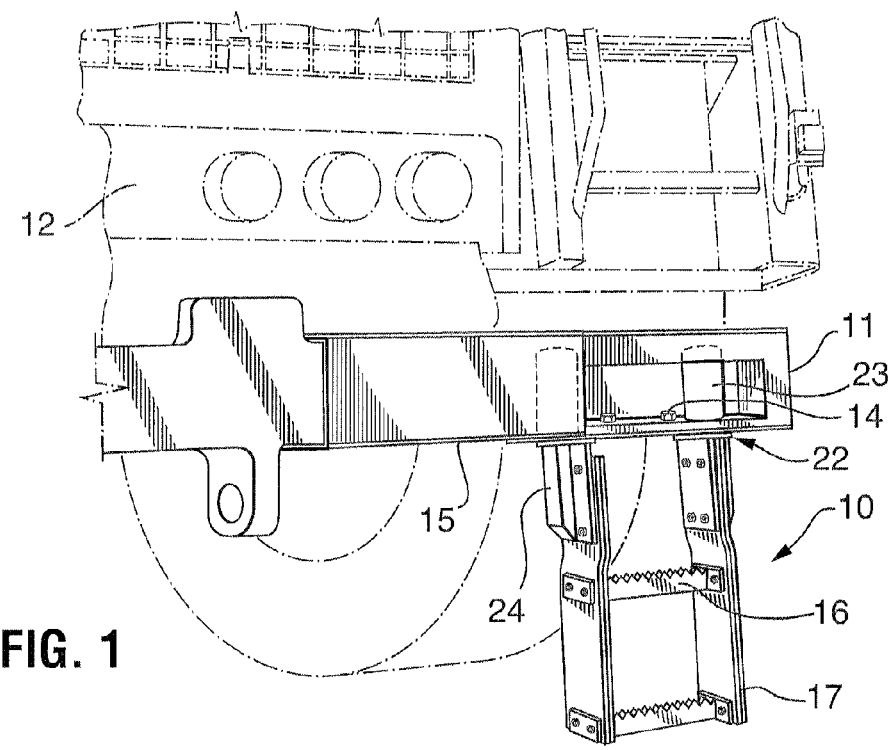
FIG. 1 shows a step assembly according to the invention operably mounted in relation to the front bumper of a vehicle.
Figure 2:
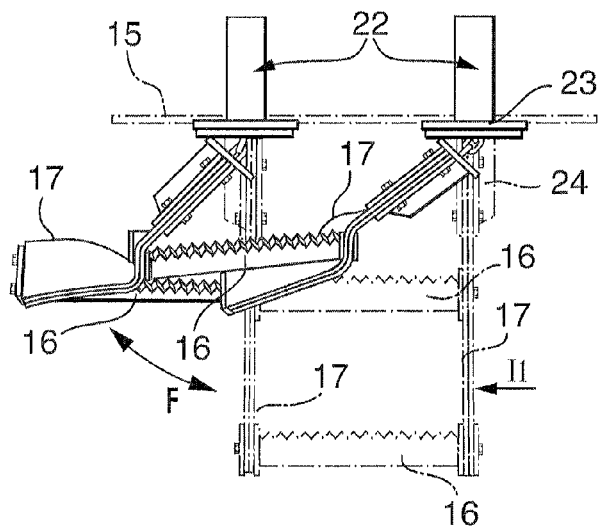
FIG. 2 is a schematic representation of the step assembly of FIG. 1 under side impact.
Figure 3:
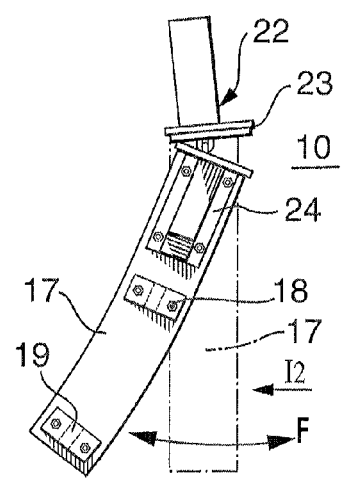
FIG. 3 is a side elevation view of the step assembly under front impact.
Figure 4:
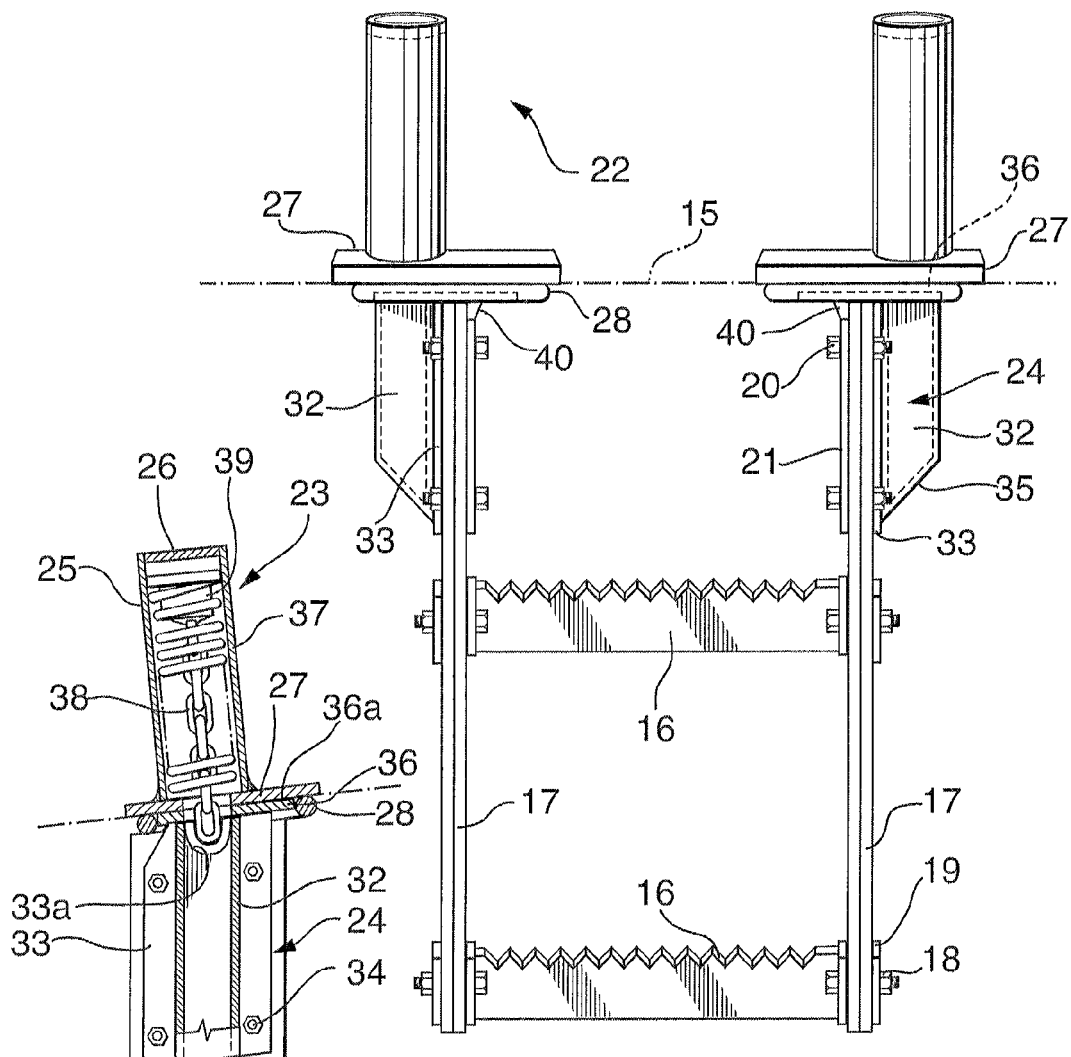
FIG. 4 is a front elevation view of the step assembly according to the invention.

A flexible step assembly for vehicles includes in combination, a plurality of horizontally extending tread members spaced one above the other and anchored at each of their ends to a flexible, vertically depending side member. A shock absorber assembly is operably attached to the uppermost section of each of the side members.

Each shock absorber assembly comprises an upper section and a lower section. The shock absorber connects at the upper section to the vehicle, while the lower section supports the side member.

The interconnected sections are coupled together and normally held in a neutral position, but can be temporarily, partially separated by impact. In particular, the two interconnected sections are partially separable under impact sufficient to permit the step assembly to move in the direction of impact such that damage to the step assembly is substantially prevented. The shock absorber on one side of the step has upper and lower interconnected sections that are separable independently of the upper and the lower interconnected sections of the shock absorber on the other side of the step. The upper and the lower interconnected sections are configured to more reliably reconnect and to focus the force of separation to deter problematic twisting of the parts.

Each shock absorber assembly includes a spring arrangement configured for connection between the upper and the lower interconnected sections, the spring assembly serving to recouple the upper and the lower interconnected sections after they are separated by impact to return the step assembly to the neutral position. The spring is configured to mitigate concerns of wear and to more reliably permit recoupling even after long periods of use.

Looking specifically at the drawings, FIGS. 1-4 show the general arrangement of the step assembly 10 mounted to the front bumper 11 of a large vehicle 12 (shown in phantom outline). While various mounting methods are available, in this embodiment, attachment is by bolts 14 to the bottom flange 15 of the bumper 11.

The step itself comprises a plurality, in this specific embodiment two, tread sections 16 mounted to extend between two side members 17. The tread sections 16 are attached to each side member 17 such as for example by bolts 18 and reinforcing plates 19. As can be seen from FIG. 4, the plates 19 and bolts 18 may sandwich their side member. The side members may be resiliently flexible to flex, arrows F, in response to an impact, such as a side impact arrow I1 or a front impact arrow I2. The treads may be less flexible such as substantially inflexible to offer a rigid surface on which a user may step. For example, tread sections 16 are often formed of steel or substantially inflexible polymer, and side members 17 may be formed from substantially thick elastomeric, such as rubber, material. In one embodiment, side members 17 are formed of a multi-ply, for example two- to four-ply, rubber reinforced belting.

Each side member 17 is attached as by bolts 20 and a reinforcing plate 21 to an associated shock absorber assembly, generally indicated at 22. Assembly 22 comprises two sections: an upper section 23 and a lower section 24. Each upper section 23 is normally secured to bumper 11, while each lower section 24 is secured to one of the side members 17.

Figure 5:
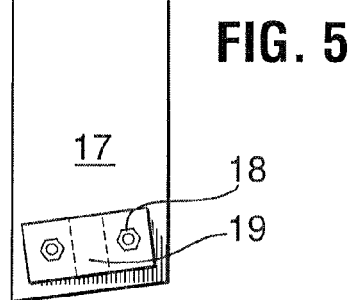
FIG. 5 is a side elevation view of the step assembly of FIG. 4, in part section.

In each shock absorber system, upper section 23 and lower section 24 are interconnected but partially separable in response to an impact, arrows I1 and I2. In particular, sections 23, 24, when installed but not experiencing an impact force, are normally biased into a neutral position (FIGS. 1 and 5). However, when an impact force, arrows I1, I2, is applied to the step, sections 23, 24 can move into a partially separated position (FIGS. 2 and 3), wherein lower section 24 can partially separate from, but remain connected to, upper section 23. This provides further freedom for the step, such as side members 17 to flex, arrows F, out of the neutral position to absorb the shock of impact. After the force of impact is discontinued, the sections 23, 24 are biased back into the neutral position.

Figure 6:
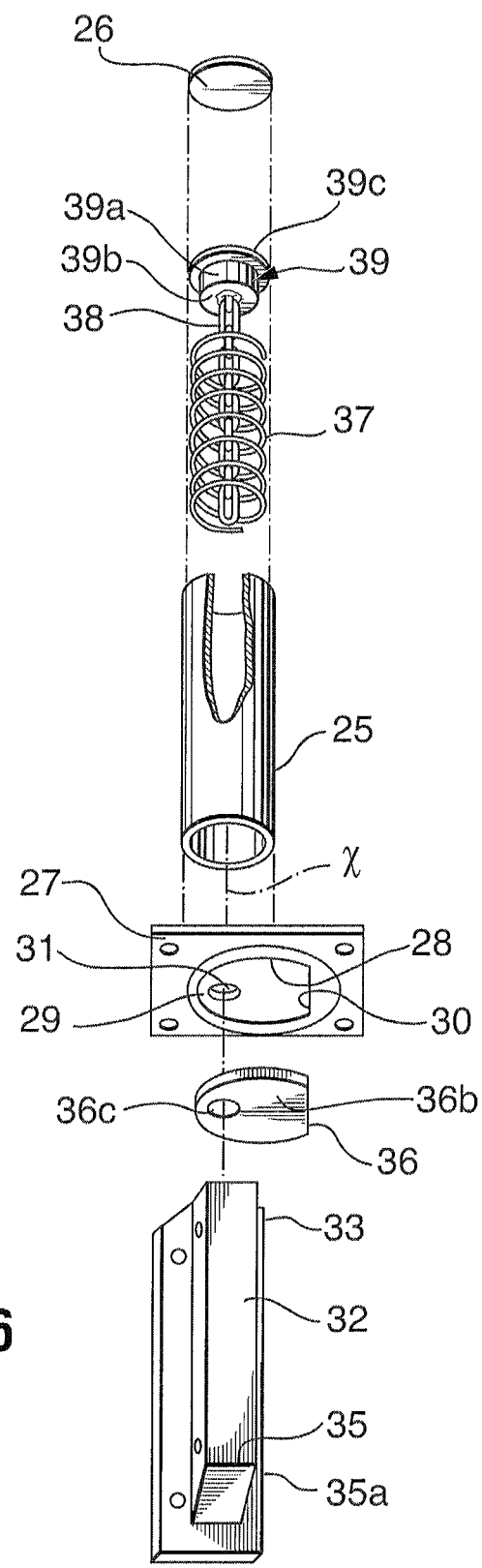
FIG. 6 is an exploded view of the component parts, which form the shock absorbing system, shown in part section on FIG. 5.
Figure 7:
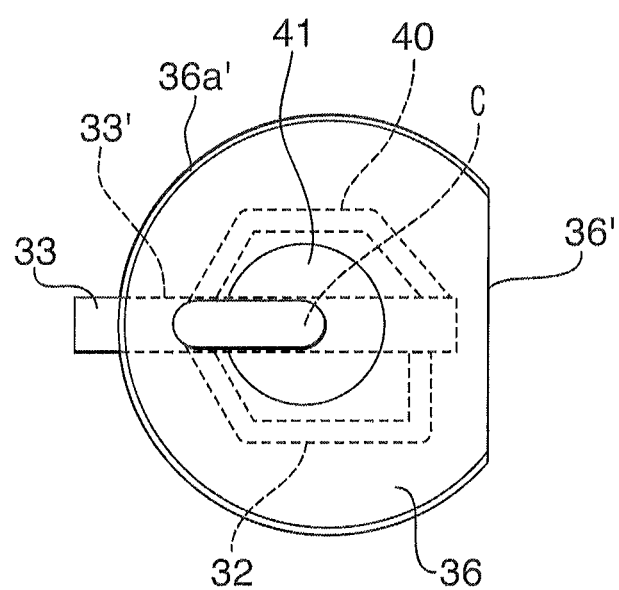
FIG. 7 is a top plan view of a top-plate useful in the present invention.

The separate components of the shock absorber assemblies can be seen in more detail in FIGS. 5-7.

Upper section 23 comprises a tubular housing 25 for housing the internal components and through which the upper section is connected to the vehicle. In this embodiment, housing 25 is closed off at its upper end by a cap 26. A flange 27 of housing 25 offers a point of attachment to the vehicle. In this embodiment, flange 27 is attached at the lower end of the housing opposite cap 26, but it could be on a side of the housing.

In this embodiment, flange 27 is configured to be attached, as by bolts 14, directly or via an interface to the vehicle chassis or, as shown, the bumper.

Since flange 27 is positioned at an end of housing 25, flange 27 acts as an end plate for the housing opposite top cap 26.

A portion of housing 25 is connected adjacent lower section 24 and provides a support against which the lower section rests, when the parts are in their neutral position. In this embodiment, lower section 24 is mounted to rest against the underside of flange 27. That underside of flange 27 is provided with a recess 29 defined within a rim 28. The configuration of the recess may be substantially circular but with a straight-edged portion 30. Rim 28 defines the shape of the recess. Rim 28 may have a rounded edge leading to recess. In one embodiment, rim 28 is formed by a shaped ring connected to flange 27. The shaped ring has a circular cross section, such that a rounded edge is provided leading to recess 29.

A hole 31 is provided through flange 27 extending between its upper surface, where housing 25 is connected, and its underside, where recess 29 is formed. Housing 25 is mounted on flange to such that hole 31 is in substantial axial alignment with the center axis x of housing 25, but recess 29 is positioned on flange 27 such that hole 31 is not concentric therein. In particular, hole 31 is positioned offset from a center point within the circular portion of rim 28.

Lower section 24 comprises a length of tubing 32 connected to a backing plate 33, the latter being the means by which the assembly is attached, by bolts 34, to a side member 17. The bottom end of tubing 32 may be closed and may be shaped to define a taper 35 to limit catching on obstructions such as brush, rocks, etc.

Section 24 also includes a top-plate 36, which is attached to the tops of tubing 32 and backing plate 33. Top-plate 36 closes off the upper end of tubing 32 and serves other purposes. Plate 36 is configured and has a perimeter edge shape to fit dimensionally, and to seat within, recess 29 on the underside of flange 27 of upper section 23. For example, plate 36 has a perimeter shape in plan view that is mostly circular, but has one flat edge 36' to match straight edge portion 30.

Top-plate 36 has an upper facing surface 36a and a lower facing surface 36b, Upper facing surface 36a faces into the recess 29 and lies against flange 27 when the step is in the neutral position. Upper facing surface 36a may have a chamfer 36a' on its perimeter edge to facilitate reentry to recess 29. In one embodiment, chamfer 36a' extends only about the circular portion of the edge and the flat edge 36' is not chamfered. The chamfer 36a' in combination with the rounded surface of rim 28 facilitates the reseating of the top-plate in the recess 29.

Upper facing surface 36a may include a concave indentation 41 in its surface approximately centrally within its perimeter shape, but the edges of surface 36b remain substantially planar. Concave indentation 41 permits some debris to migrate between top-plate 36 and flange 27 without adversely impacting the flat seating of the plate 36 in the recess. In particular, debris such as dirt, if it is present at the interface between upper facing surface 36a and flange 27, may be urged into indentation 41. Thereby debris can move away from the edges where it may otherwise cause the plate to wobble in recess 29.

Backing plate 33 is attached at its upper end to lower facing surface 36b of top-plate 36 and is positioned to substantially overlie a center point C of the plate, relative to the circular perimeter. In particular, as can be seen in FIG.

7, the end of backing plate 33 is connected to top-plate 36 in a connection position 33' that extends diametrically along a diameter of the top-plate and substantially bisects the plate into two half areas.

A top end of tubing 32 is also connected to top-plate 36 and is secured against one of the half areas. The tubings 32 are connected on the outside of the backing plates. Stated another way, on the left side of the step, the top end of tubing 32 may be positioned on the left, outer side half of top-plate 36 and on the right side of the step, the top end of tubing 32 may be positioned on the right, outer side half of that right side top-plate 36.

A gusset 40 may be installed for reinforcement between backing plate 33 and top-plate 36 on the half area opposite tubing 32.

Upper and lower sections 23 and 24 are resiliently coupled together such that they can be recoupled when separated by impact. The resilient coupling in the illustrated embodiment, is provided by a spring 37 and an inextensible and flexible connector such as a chain 38 (shown here), a cable, etc. Spring 37 is installed in upper section 23, as will be described later. Chain 38 is connected to spring 37 and extends from upper section 23 to a mounting site on the lower section 24. In particular, chain 38 extends from upper section 23, through hole 31 in flange 27 and is connected to lower section 24 at a mounting site at upper surface 36a of plate 36. In this illustrated embodiment, chain 38 is connected into a hole 36c in top-plate 36.

In lower section 24, the mounting site to chain 38 is on upper facing surface 36a in a position substantially aligned with the location of backing plate 33 on lower facing surface 36b. As such, in this illustrated embodiment, hole 36c, through which chain 38 is secured, is provided on top-plate 36 in a position substantially aligned with the connected location of plate 33. The length of hole 36c may be substantially aligned with the plane of plate 33. Hole 36c closely follows the full outer cross sectional shape of a chain link such that the chain link is held securely in the hole. This minimizes twist and side movement of the chain link in the hole 36c to minimize shear forces at that connection.

Because the connection point of chain 38 and the connection point of backing plate 33 are aligned on opposite sides of the top-plate 36, in this embodiment, backing plate 33 may include a notch 33a on its upper end to accommodate the connection to chain 38.

Chain 38 may be connected to plate 36 in a position offset from the plate's center point C. As such, hole 36c is positioned to be offset from center point C. The connection point for chain 38 on plate 36 may be closer to the front of the plate, such that there is more stability for loads applied on the front of the step, such as a user climbing the step. The flat edge 30 of recess and the corresponding flat edge 36' of top-plate 36 may be positioned at the back of the assembly and therefore the step. As such, any pivot of top-plate 36 away from recess 29, toward the back, which would be the most common type of pivot occurring when a user climbs the step, may be securely about the two flat surfaces, which together act as an elongate hinge.

Hole 36c may extend into indentation 41 and in that position may provide an opening through which debris can be pushed out of the indentation to assist with the proper seating of plate 36 against recess 28.

When the step is in the neutral position, spring 37 is axially extended and pulls chain 38 and plate 36, such that plate 36 is snugly located within recess 29. Spring 37 may, for example, be a compression spring that offers resistance to a compressive force applied axially. This brings the entire assembly into tension, to maintain the steps in a vertical and downwardly extending position.

When there is an impact load I1 and/or I2 on the step, top-plate 36 is at least tipped and may pull entirely out of recess 29. This causes chain 38 to be pulled down, which compresses spring 37. When the load is discontinued, spring 37 biases chain 38 to be pulled up into the upper section 23 and with the chain, plate 36 is drawn back into recess 29.

As can be seen from FIG. 5, the spring 37 is contained within tubular housing 25 of upper section 23, and chain 38 passes centrally through spring 37 and is connected to a pull cup 39. The pull cup is free to ride vertically within the elongate tubular member, but cannot move through the spring and, as such, is limited in its downward movement by resistance of the spring to compression. To mitigate binding of the spring in housing 25, pull cup 39 includes an elongate cup portion 39a formed as a cylinder, sized to fit centrally within spring 37, a base 39b that connects to chain 38 and an upper annular flange 39c extending radially out from cup portion 39a. Upper annular flange 39c has a diameter larger than the inner diameter of the spring and, as such, overlies the upper end of the spring and prevents the cup from pulling through the spring. Thus, cup 39, and therefore the chain, cannot move down in housing 25 of upper section 23, unless the spring compresses. However, the connection to the chain is at base 39, which is the end opposite from annular flange 39b. This connection at base, ensures pull cup 39 maintains centered in spring and that force is applied to spring to move it substantially axially within housing.

In one embodiment, as well, ends 37a, 37b of spring are formed flat, as by tapering the last turn of the spring towards its end. This allows the spring to present flat contact surfaces against flange 27 at the bottom of housing 25 and against upper annular flange 39c of the pull cup. This also mitigates binding of the spring within housing 25. In addition, milling of the spring's ends to form flats, rather than leaving them as blunt cuts, decreases the compression height of the spring, which increases the possible amount of the travel before bottoming out.

The parts of the shock absorbing assembly are made of durable materials able to withstand the rigors of use, as will be expected in mining, forestry, construction, etc. In one embodiment, for example, the parts are made of steel or durable polymers. If steel is employed, construction may be by pressing, stamping, milling, welding, etc. as will be appreciated.

It will be appreciated from the above description that when the step assembly is under impact loads from any direction, the springs 37 will allow the lower section 24 of the shook absorbing assembly to partially separate from the upper section 23 in the area of plate 36 and its interrelationship with recess 29 in flange 27. On impact, plate 36 will be forced out of recess 29 at least to some degree, by tipping or pulling out fully. This will permit approximately 90 degrees of movement, in the direction of impact, of the step assembly. After impact, however, the spring 37 will return the assembly back to its original vertical position, the neutral position, wherein plate 36, by virtue of its configuration, mates back into the same position within recess 29. In other words, the orientation of the assembly following spring return will be as before impact.

The orientation of the backing plate 33 connected at its upper end to extend diametrically along a diameter of the top-plate 36 mitigates twisting of the lower sections 23 when they move by impact in and out of the recess. Since a pull on the step may generate side torque at the shock absorber assembly, centralizing the pull and tipping motion by centrally positioning backing plate 33 on top-plate 36 greatly reduces side twist and thereby reduces twist of the top-plate to the outside of the vertical plane.

The formation of the spring's ends flattened and the use of pull cup ease movement of spring 37 within housing 25, preventing binding of the spring and increasing the useful life of the spring and the housing.

By adjusting the spring compression the steps remain essentially rigid when being ascended by an operator, for example, the utilization of springs which require approximately 1300 pounds pressure to compress, is sufficient to hold a 225 pound person, and not deviate from the vertical position when being used.

It is to be understood that the embodiment of the invention herein described is merely illustrative of the application of the principles of the invention. Reference herein to details of the illustrated embodiment is not intended to limit the scope of the claims. The scope of the invention is therefore to be considered broadly defined and is specified in the appended claims.

What I claim is:

1. A flexible step assembly for vehicles comprising in combination:
    a first flexible, vertically depending side member and a second flexible, vertically depending side member, each of the first and the second side members having an upper portion; at least one horizontally extending tread member attached between the first and the second side members; a first shock absorbing assembly operably connected to the upper portion of the first side member and a second shock absorbing assembly operably connected to the upper portion of the second side member, each of the first and second shock absorbing assemblies including an upper section, a lower section and a resilient connection between the upper section and the lower section, the upper section and the lower section being resiliently interconnected and partially separable under impact by the resilient connection, sufficient to permit the step assembly to move such that damage of the step assembly due to impact is substantially prevented, wherein:
    the resilient connection serves to recouple the upper section and the lower section when separated by impact;
    the lower section of each of the first and the second shock absorbing assembly comprises a top-plate secured to the resilient connection and being configured to bear at an upper facing surface against the upper section and a backing plate for connecting the first and the second shock absorbing assembly to the upper portions of the first and second side members, the backing plate of each of the first and the second shock absorbing assembly including an upper end connected to, and extending along a diameter of, a lower facing surface of the top-plate;
    the upper section of each of the first and the second shock absorbing assemblies comprising an elongate hollow tubular member having a lower opening and a flange extending about the lower opening, the flange including a recess on its bottom surface and wherein the plate of the lower section of each of the first and the second shock absorbing assemblies is configured to fit in and interlock with the recess; and
    the resilient connection including a spring in the elongate tubular member and a flexible connector extending from a pull cup on the spring centrally through the spring, through the lower opening to a mounting site on the top-plate.

2. The flexible step assembly according to claim 1 wherein the upper section of each of the first and the second shock absorbing assemblies including a bottom end and a recess on the bottom end and wherein the plate of the lower section of each of the first and the second shock absorbing assemblies is configured to fit in and interlock with the recess.

3. The flexible step assembly according to claim 1 wherein the spring means includes a compression spring.

4. The flexible step assembly according to claim 3 wherein the top-plate and the recess are formed to correspond so that the plate can interlock with the recess in one orientation only.

5. The flexible step assembly according to claim 1 further comprising a concave indentation on the upper facing surface of the top-plate.

6. The flexible step assembly according to claim 5 wherein the concave indentation is positioned substantially centrally relative to a perimeter of the upper facing surface and an edge of the upper facing surface along the perimeter is substantially planar.

7. The flexible step assembly according to claim 1 wherein the resilient connection is secured at a mounting site to the top-plate and the mounting site is aligned with the position of the backing plate.

8. The flexible step assembly according to claim 7 wherein the mounting site is offset from a center point of the upper facing surface closer to a front of the flexible step assembly.

9. The flexible step assembly according to claim 1 wherein the first and the second side members are of rubber.

10. The flexible step assembly according to claim 1 wherein the upper section of each of the first and the second shock absorbing means is configured to be fixedly held on a portion of a vehicle.

11. A flexible step assembly for vehicles comprising in combination:
    a first flexible, vertically depending side member and a second flexible, vertically depending side member, each of the first and the second side members having an upper portion;
    at least one horizontally extending tread member attached between the first and the second side members;
    a first shock absorbing assembly operably connected to the upper portion of the first side member and a second shock absorbing assembly operably connected to the upper portion of the second side member, each of the first and second shock absorbing assemblies including an upper section, a lower section and a resilient connection, the upper section and the lower section being resiliently interconnected and partially separable under impact by the resilient connection, sufficient to permit the step assembly to move in a direction of impact such that damage of the step assembly due to impact is substantially prevented, wherein:
    the resilient connection serves to recouple the upper section and the lower section when separated by impact and the resilient connection includes:
        a spring; and
        a flexible connector extending from a pull cup on the spring centrally through the spring;
    the lower section of each of the first and the second shock absorbing assemblies comprises:

a top-plate secured at a mounting site to the flexible connector and being configured to bear at an upper facing surface against the upper section; and a backing plate each for connecting one of the first and the second shock absorbing assembly to the upper portion of one of the first and second side members, the backing plate connected to and extending along a diameter of a lower facing surface of the top-plate; and the upper section of each of the first and the second shock absorbing assemblies comprises:

an elongate hollow tubular member having a lower opening; and a flange extending about the lower opening, the flange including a recess on its bottom surface and wherein the top-plate of the lower section is configured to fit in and interlock with the recess.

12. The flexible step assembly according to claim 11 wherein the spring means includes a compression spring.

13. The flexible step assembly according to claim 11 wherein the top-plate and the recess are formed to correspond so that the plate can interlock with the recess in one orientation only.

14. The flexible step assembly according to claim 11 wherein the pull cup includes an upper annular flange and an elongate cup secured to the upper annular flange and extending from the upper annular flange to a base end, the upper annular flange having a diameter larger than an inner diameter of the spring and the upper annular flange is retained on an upper end of the spring with the elongate cup extending down into the inner diameter between turns of the spring and being connected to the flexible connector at the base end.

15. The flexible step assembly according to claim 11 further comprising a concave indentation on the upper facing surface of the top-plate.

16. The flexible step assembly according to claim 15 wherein the concave indentation is positioned substantially centrally relative to a perimeter of the upper facing surface and an area along the perimeter of the upper facing surface is substantially planar.

17. The flexible step assembly according to claim 11 wherein the mounting site is aligned with the position of the backing plate on the top-plate.

18. The flexible step assembly according to claim 17 wherein the mounting site is offset from a center point relative to a perimeter of the upper facing surface and closer to a front of the step assembly.

19. The flexible step assembly according to claim 18 wherein the recess has a perimeter shape including a circular portion and a straight portion and the top-plate has a shape that fits into the recess in one orientation only, the top plate shape including a flat edge that fits against the straight portion and wherein the straight portion and the flat edge are positioned at a back side of the step assembly.

20. A flexible step assembly for vehicles comprising in combination:

a first flexible, vertically depending side member and a second flexible, vertically depending side member, each of the first and the second side members having an upper portion; at least one horizontally extending tread member attached between the first and the second side members; a first shock absorbing assembly operably connected to the upper portion of the first side member; and a second shock absorbing assembly operably connected to the upper portion of the second side member, each of the first and second shock absorbing assemblies including an upper section, a lower section and a resilient connection between the upper section and the lower section, the upper section and the lower section being resiliently interconnected and partially separable under impact by the resilient connection, sufficient to permit the step assembly to move such that damage of the step assembly due to impact is substantially prevented, wherein:

the resilient connection serves to recouple the upper section and the lower section when separated by impact, the resilient connection including a compression spring in the upper section and a flexible connector extending from a pull cup on the compression spring to a mounting site on the top-plate; and the lower section of each of the first and the second shock absorbing assembly comprises a top-plate secured to the resilient connection and being configured to bear at an upper facing surface against the upper section and a backing plate for connecting the first and the second shock absorbing assembly to the upper portions of the first and second side members, the backing plate of each of the first and the second shock absorbing assembly including an upper end connected to, and extending along a diameter of, a lower facing surface of the top-plate.

21. The flexible step assembly according to claim 20 wherein the upper section of each of the first and the second shock absorbing assemblies including a bottom end and a recess on the bottom end and wherein the plate of the lower section of each of the first and the second shock absorbing assemblies is configured to fit in and interlock with the recess.

22. The flexible step assembly according to claim 20 wherein the pull cup includes an upper annular flange and an elongate cup secured to the upper annular flange and extending from the upper annular flange to a base end, the upper annular flange having a diameter larger than the spring and being retained on an upper end of the spring and the elongate cup extending down between turns of the spring and being connected to the flexible connector at the base end.

23. The flexible step assembly according to claim 20 further comprising a concave indentation on the upper facing surface of the top-plate.

24. The flexible step assembly according to claim 23 wherein the concave indentation is positioned substantially centrally relative to a perimeter of the upper facing surface and an edge of the upper facing surface along the perimeter is substantially planar.

25. The flexible step assembly according to claim 20 wherein the resilient connection is secured at a mounting site to the top-plate and the mounting site is aligned with the position of the backing plate.

26. The flexible step assembly according to claim 25 wherein the mounting site is offset from a center point of the upper facing surface closer to a front of the flexible step assembly.

27. A flexible step assembly for vehicles comprising in combination:

a first flexible, vertically depending side member and a second flexible, vertically depending side member, each of the first and the second side members having an upper portion; at least one horizontally extending tread member attached between the first and the second side members; a first shock absorbing assembly operably connected to the upper portion of the first side member; and, a second shock absorbing assembly operably connected to the upper portion of the second side member, each of the first and second shock absorbing assemblies including an upper section, a lower section and a resilient connection between the upper section and the lower section, the upper section and the lower section being resiliently interconnected and partially separable under impact by the resilient connection, sufficient to permit the step assembly to move such that damage of the step assembly due to impact is substantially prevented, wherein:

the resilient connection serves to recouple the upper section and the lower section when separated by impact;

the lower section of each of the first and the second shock absorbing assembly comprises a top-plate secured to the resilient connection and being configured to bear at an upper facing surface against the upper section and a backing plate for connecting the first and the second shock absorbing assembly to the upper portions of the first and second side members, the backing plate of each of the first and the second shock absorbing assembly including an upper end connected to, and extending along a diameter of, a lower facing surface of the top-plate, and the upper facing surface of the top-plate including a concave indentation.

28. The flexible step assembly according to claim 27 wherein the concave indentation is positioned substantially centrally relative to a perimeter of the upper facing surface and an edge of the upper facing surface along the perimeter is substantially planar.

29. A flexible step assembly for vehicles comprising in combination:

a first flexible, vertically depending side member and a second flexible, vertically depending side member, each of the first and the second side members having an upper portion; at least one horizontally extending tread member attached between the first and the second side members; a first shock absorbing assembly operably connected to the upper portion of the first side member; and a second shock absorbing assembly operably connected to the upper portion of the second side member, each of the first and second shock absorbing assemblies including an upper section, a lower section and a resilient connection between the upper section and the lower section, the upper section and the lower section being resiliently interconnected and partially separable under impact by the resilient connection, sufficient to permit the step assembly to move such that damage of the step assembly due to impact is substantially prevented, wherein:

the resilient connection serves to recouple the upper section and the lower section when separated by impact;

the lower section of each of the first and the second shock absorbing assembly comprises a top-plate secured to the resilient connection and being configured to bear at an upper facing surface against the upper section and a backing plate for connecting the first and the second shock absorbing assembly to the upper portions of the first and second side members, the backing plate of each of the first and the second shock absorbing assembly including an upper end connected to, and extending along a diameter of, a lower facing surface of the top-plate; and the resilient connection being secured at a mounting site to the top-plate and the mounting site is aligned with the position of the backing plate, the mounting site being offset from a center point of the upper facing surface closer to a front of the flexible step assembly.

* * * * *